(12) United States Patent
Toliver

(10) Patent No.: US 7,920,790 B2
(45) Date of Patent: Apr. 5, 2011

(54) POLARIZATION ENVELOPE MODULATION FOR SIGNALING AND LABELING IN OPTICAL NETWORKS

(75) Inventor: Paul Toliver, Tinton Falls, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 987 days.

(21) Appl. No.: 11/517,983

(22) Filed: Sep. 8, 2006

(65) Prior Publication Data

US 2008/0063409 A1   Mar. 13, 2008

(51) Int. Cl.
*H04J 14/06* (2006.01)
(52) U.S. Cl. .............................. 398/65; 398/51; 398/152
(58) Field of Classification Search .................... 398/51, 398/54, 65, 66, 152
See application file for complete search history.

(56) References Cited

U.S. PATENT DOCUMENTS

| | | | |
|---|---|---|---|
| 4,779,266 A | 10/1988 | Chung et al. | |
| 4,866,699 A | 9/1989 | Brackett et al. | |
| 6,259,723 B1 | 7/2001 | Miyashita | 375/141 |
| 6,381,053 B1 | 4/2002 | Fathallah et al. | 398/99 |
| 6,608,721 B1 | 8/2003 | Turpin et al. | |
| 7,024,112 B2 * | 4/2006 | Way | 398/51 |
| 2002/0145787 A1 * | 10/2002 | Shpantzer et al. | 359/136 |
| 2004/0033074 A1 * | 2/2004 | Hsu | 398/51 |
| 2004/0264695 A1 | 12/2004 | Turpin | |
| 2006/0051092 A1 * | 3/2006 | Way | 398/79 |
| 2006/0159454 A1 * | 7/2006 | Bjornstad | 398/51 |
| 2010/0054657 A1 * | 3/2010 | Murphy et al. | 385/12 |

OTHER PUBLICATIONS

Y. Igarashi et al., "Multirate Coherent Ultrashort Light Pulse CDMA Communication Systems with Multipulse PPM and Power Control," 2004 RISP International Workshop on Nonlinear Circuit and Signal Processing, Hawaii, USA., Mar. 5-7, 2004, pp. 45-48.
A. J. Viterbi, "Principles of Spread Spectrum Communication," Addison-Wesley Publishing Company, pp. 97-98, 1995.
Z. Jiang et al., "High-Contrast Nonlinear Waveform Discrimination at 10GHz in an Ultrafast O-CDMA Testbed," Ultrafast Optics and Optical Fiber Communications Laboratory, Purdue University, IEEE LEOS Annual Meeting, Tucson, AZ, Oct. 2003.
Z. Li et al., "Simulation of Mode-locked Ring Laser Based on Nonlinear Polarization Rotation in a Semiconductor Optical Amplifier", in Proc. ICTON 2004, Warsaw, Poland, Jul. 2004, pp. 318-321.

* cited by examiner

*Primary Examiner* — Dzung D Tran
(74) *Attorney, Agent, or Firm* — Philip J. Feig

(57) ABSTRACT

The present invention is directed to an in-passband signaling method. The method includes the steps of extracting a control component and a data component from an optical signal. The control component may be used to determine the state of an optical switch in either a packet-switched network or circuit-switched network. The state of the optical switch is switched based on the extracted control signal. The control component may also be used to provide other network functions such as network operations, administration, and management (OA&M), network monitoring, and network control and management (NC&M). The control component is erased by polarization realignment of the optical signal. The control component is updated by remodulating the polarization state of the data component.

19 Claims, 1 Drawing Sheet

POLARIZATION ENVELOPE MODULATION FOR SIGNALING AND LABELING IN OPTICAL NETWORKS

FIELD OF THE INVENTION

The present invention relates to transmission of control signals in an optical network. More specifically, the present invention is directed to in-passband signaling over an optical channel.

BACKGROUND OF THE INVENTION

The demand on today's networks is increasing in what has been dubbed as the information age. The need for networks with higher capacities at lower costs are being fueled by the growth of the Internet and the World Wide Web as well as the number of business and residential customers utilizing high speed networks for day to day functions.

Control signals are used in such networks for a variety of functions. As an example, in circuit switched or based networks, signaling channels are used as a type of control signal for network control and configuration, network management, routing protocols and network monitoring. In packet switched or based networks, packet headers or labels are used as type of control signal to direct or route packets to their destination. In order to keep the costs associated with processing control signals in high-speed networks low (whether they are circuit-switched or packet-switched), one of the goals is to be able extract only the control signal at intermediate nodes without having to also extract the entire high-speed data stream.

A solution to the demand for higher speed networks is an optical network. Optical networks utilize optical fibers which offer higher bandwidths and are less susceptible to electromagnetic interference and other undesirable effects. Control signals in optical networks may be transmitted "out-of-band" or "in-band". In "out-of-band" methods, control signals are placed outside of the channel's optical filter bandwidth. For example, in out-of-band signaling such control signals may be placed on a separate wavelength than that of the data channel. An example of this is the optical supervisory channel (OSC) commonly used in dense wavelength division multiplex (DWDM) systems.

In "in-band" communications, the control signal is maintained within the optical filter bandwidth maintained for transporting a particular channel through a network. The most common approach to an "in-band" control signal is to time division multiplex (TDM) control information along with the data. Other "in-band" techniques include subcarrier multiplexing (SCM), amplitude modulated tones, and differential phase-shift keying (DPSK) envelopes. These techniques have significant drawbacks, particularly when scaling to high data rates. As data rates increase, the reading and writing hardware for TDM and SCM schemes become complex. In addition, to be able to rewrite control information as the data passes through network elements generally requires the use of a laser source to perform the erasure and rewriting process for the majority of the developed "in-band" control schemes. In addition, the TDM and DPSK methods typically require substantially tight synchronization between the data and control signal at high data rates.

For instance, with regard to high frequency SCM, in order to implement this technique, high frequency electronics are required since the label spectrum (i.e., the optical bandwidth the label occupies) must be positioned above the highest frequency component in the data spectrum. Also, a power penalty is introduced due to a SCM modulation index. There are also issues with control signal erasure and rewrite. For instance, for control signal erasure, high frequency SCM requires the use of an optical filter or a non-transparent regenerator/wavelength converter. Control signal rewrite requires the use of a dedicated laser followed by remodulation. Such techniques are also difficult to integrate with high payload rates. Additionally, high frequency SCM resembles an "out-of-band" technique when, in fact, it presents dispersion issues of an ultra-wideband signal.

As another example of an "in-band" communication with drawbacks, high bit rate header methods present their own problems. In a high bit rate header method, high speed processing is required since the control signal is operating at a rate comparable to the data channel rate. There may also be challenges with regard to reading, erasing and rewriting of control signals. For example, reading control signals may require high speed demultiplexing or optical correlation. Erasing control signals may require the use of high speed optical gating and nonlinear methods for optical limiting. Control signal rewriting may require a laser and high speed modulation. The timing may also be critical in control signal rewriting.

The use of DPSK as a control signal requires high levels of coherency in the optical signal in order to have proper constructive and/or destructive interference at the receiver's DPSK demodulator. As such, the DPSK method is not transparent to signal format. The DPSK method may also have issues regarding control signal reading, erasing and rewriting. For example, reading control signals may require phase-sensitive detection. Erasing control signals may require the use of a non-transparent regenerator/wavelength converter. Control signal rewriting may require a dedicated laser followed by remodulation.

SUMMARY OF THE INVENTION

One aspect of the present invention is directed to an in-passband signaling method. In the method, a control component and data component may be extracted from an optical signal. In a packet-switched network, the control signal may be used for example to determine the state of the optical routing switch on a packet by packet basis. In a circuit-switched network, the control signal may be used for example to determine the state of the optical circuit switch. In both circuit and packet-switched networks, the control signal may be used for additional network functions such as network operations, administration, and management (OA&M), network monitoring, and network control and management (NC&M). The control component may be erased by realigning the polarization state of the data signal and then rewritten by remodulating the polarization state of the data component.

Further, in another aspect of the invention, the control component is extracted by monitoring the temporally evolution of polarization state for an optical signal.

In yet another aspect of the invention, the data component is extracted by using conventional optical photoreceivers, which are insensitive to the polarization state of the optical signal.

In yet another aspect of the invention, the control component of the optical signal is a polarization envelope modulated signal.

In another aspect of the present invention, an optical node suitable for in-passband communication may be provided. The optical node may include a control erase element operable to realign the polarization state of an optical signal to a fixed polarization state. It may also include a control read element operable to the monitor polarization state of the optical signal in order to obtain a control component. An optical packet switch operable to switch the data component from one circuit to another circuit may also be provided in addition to a processing circuit operable to extract the control, operable to switch a state of the optical switch based on the control signal and operable to update the control component. The optical node may also include a control re-write element operable to update the control component.

Further, in another aspect of the invention, the control component of the optical signal is a polarization envelope modulated signal.

In yet another aspect of the invention, the control erase element further comprises a polarization modulator and a control circuit.

In yet another aspect of the invention, the control read element is a polarimeter.

In yet another aspect of the invention, the optical switch comprises single-polarization switch fabric.

In another aspect of the present invention, an optical packet is provided. The optical packet includes a data portion for transporting information and a header portion appended to the data portion. The header portion contains control information for routing the packet over an optical network, and is encoded using optical polarization states present in optical signals forming the optical packet.

Further, in another aspect of the invention, control information comprises an address label that comprises routing information.

In yet another aspect of the invention, the control information comprises an address label that comprises an IP address.

In yet another aspect of the invention, the optical data signal is in code division multiple access format.

In yet another aspect of the invention, the optical data signal is in a pulsed return to zero format.

In yet another aspect of the invention, the optical data signal is in differential phase-shift keying format.

In yet another aspect of the invention, the optical data signal is in chirped return to zero format.

In yet another aspect of the invention, the optical data signal is in non return to zero format.

In yet another aspect of the invention, the optical data signal is in analog subcarrier multiplexed format.

In yet another aspect of the invention, the control signal portion is polarized enveloped modulated.

BRIEF DESCRIPTION OF THE DRAWINGS

A more complete appreciation of the subject matter of the present invention and the various advantages thereof can be realized by reference to the following detailed description in which reference is made to the accompanying drawings wherein like reference numbers or characters refer to similar elements.

DETAILED DESCRIPTION OF THE INVENTION

Figure 1:
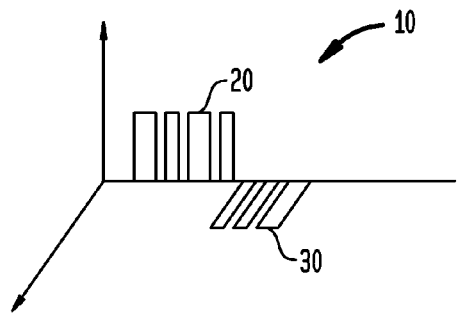
FIG. 1 is an illustration of an optical packet in accordance with an aspect of the present invention.

The present invention may be utilized on an optical circuit-switched and packet-switched networks. A network is a series of interconnected nodes for transmitting information from one node to another node. In an optical fiber network, the nodes are connected by optical fibers. Information is encoded into an optical signal and transmitted as light through such optical fibers. Each node receives the optical signal which may include data and a control signal. In a packet-switched network, the control signal may indicate the final destination for the optical packet. Each node may include information regarding the most efficient pathway for transmitting the optical packet. As such, when the node receives the optical packet, it may rewrite the control signal of the optical packet based on the most efficient pathway. In a circuit-switched network, the control signal may be used, for example, to determine the state of the optical circuit switch. In both circuit and packet-switched networks, the control signal may be used for additional network functions such as network operations, administration, and management (OA&M), network monitoring, and network control and management (NC&M).

One type of optical network environment is a transparent optical network. In a transparent optical network, signals do not undergo optical-electronic-optical conversion at switching points. In order for a control signal approach to work properly in a transparent optical network, typically has to be compatible with ultra high payload capacities with minimal signal distortion and minimum power penalty. The control signal may have to be erased and updated with low loss, low effective noise figure and low complexity. Erasure of a control signal may have to occur without 2R (reamplificaion and reshaping)/3R (retiming, reshaping, and reamplification)/λ-conversion.

In addition, there may have to be a tight coupling between the control signal and the data such that if the control signal makes it through the network, so will the data. Also, for a packet-switched network, in order to limit inter-packet gap size, the synchronization between the header and the data over large distance may have to be controlled.

The approach may also have to have a high degree of transparency to data modulation formats such as pulsed return to zero (RZ), chirped return to zero (CRZ), DPSK, non return to zero (NRZ), multi-level optical code division multiple access (OCDMA) and analog SCM to name a few. In other words, the control signal approach may be utilized with any data modulation format. The hardware used in such an approach may have low power requirements because each node may need read/erase/rewrite capabilities. The approach would also be compatible with low cost, low bandwidth and electronic control signal processing and can be easily integrated with optical data plane subsystems. The present invention, as described below, may include the features described above for a control signal approach to work properly in a transparent optical network.

FIG. 1 is an illustration of an optical signal that may be processed in accordance with an embodiment of the invention. Optical signal 10 includes data 20 and control 30. Data 20 may be any information that is transmitted over a network such as an optical network. Control 30 is preferably a polarization envelope modulated control signal. In a packet-switched network, Packet control 30 may be a control signal to direct or route the packet data to its destination as is discussed in more detail below. The control signal may be imparted on top of the data 20 by using a polarization modulator that switches the optical polarization state between, for example, horizontal and vertical polarization at the control signal data rate.

As an example, optical signal 10 may be transmitted in code division multiple access (CDMA) format. CDMA has been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. Optical signal 10, which is formed from optical pulses, is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"'s and logic "0"'s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses that form the optical signal 10. The pulses comprise Fourier components whose phases are coherently related to one another. Each Fourier component is generally referred to as a frequency bin. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

Although the above description describes an optical signal in an OCDMA format, the system of the present invention is applicable to any format suitable for use in an optical network.

Figure 2:
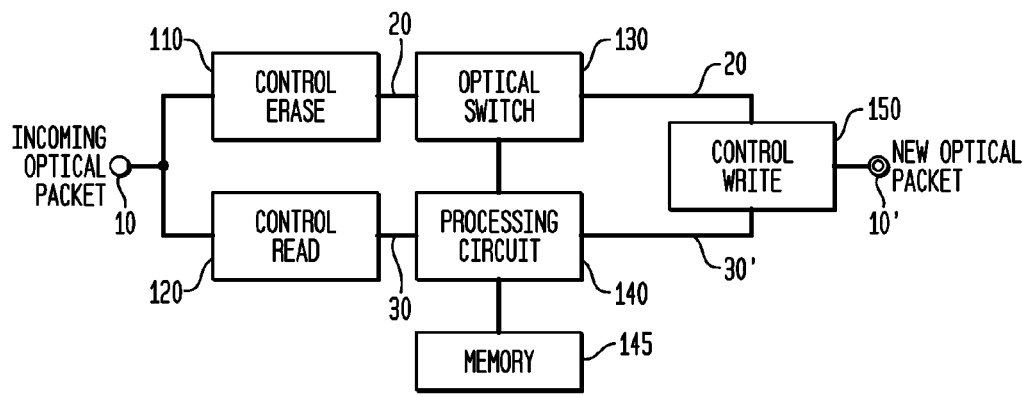
FIG. 2 is a diagram of an apparatus in accordance with an aspect of the present invention.
Figure 3:
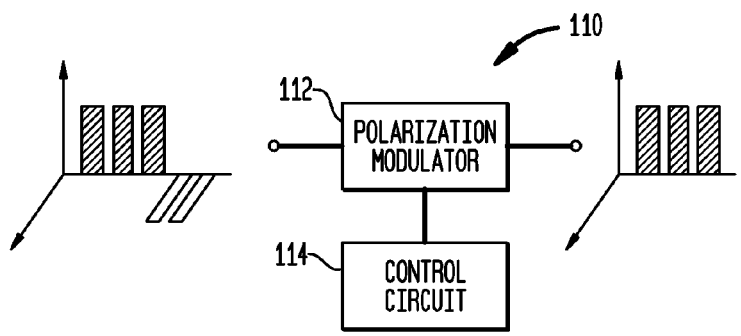
FIG. 3 is a diagram of a header erase element in accordance with an aspect of the present invention.

FIG. 2 is a diagram of an apparatus 100 that may receive an optical signal 10 and output a new optical signal 10'. Apparatus 100 may be a network switching node or any other network element. In apparatus 100, an optical signal 10 may be received by a control erase element 110. The control erase element 110 may perform a polarization realignment on optical signal 10 and output data 20 by realigning a polarization state associated with the incoming optical signal 10 to a fixed polarization. Such realignment may be accomplished through the use of a polarization modulator 112 and a control circuit 114 as shown in FIG. 3. Control circuit 114 controls the polarization modulator 112 to change the polarization of the incoming optical signal to a fixed polarization state, e.g., horizontal or vertical. Each state may represent 1 or 0 bit in a binary coding scheme Output data 20 may be received by an optical switch 130 which may perform optical data processing. Optical switch 130 outputs the processed data 20 to control write element 150. Because data 20 may have a fixed polarization, optical switch may use single-polarization switch fabrics which may have a higher performance as compared to polarization-independent switches.

In addition to the control erase element 110, optical signal 10 may be received by a control read element 130. Control read element 120 may be a polarimeter that may perform a passive optical polarization state monitoring on the optical signal. In other words, control read element 120 detects the polarization state of the incoming optical signal 10 and filters out the control signal 30. Control signal 30 may be received by a processing circuit 140 whose operation will be described below. In a packet-switched network, processing circuit 140 processes the data packet and outputs a new control signal as a packet header 30' to the control write element 150. Control write element 150 receives processed data 20 and the new control signal 30' and it may perform a polarization re-modulation on processed data 20 and the new control signal 30' to generate a new optical signal 10'.

As shown in FIG. 1, control 30, which may include the control signal, may be encoded as a polarization envelope of the data signal. When optical signal 10 is received by the control read element 130, control read element 130 filters out the control signal by monitoring the polarization state of the packet. The control signal 30 may be received by processing circuit 140.

In a packet-switched network, control signal 30 may contain destination information for the optical signal 10. As such, when processing circuit 140 receives control signal 30, the processing circuit 140 determines the destination from the control signal 30. Processing circuit 140 may be coupled to a memory 145 that may contain routing tables. Each entry in a routing table may have at least two fields: an address prefix or label and next hop. The next hop is the address of another node that may be coupled via optical link. The address prefix or label specifies a set of destinations for which the routing entry may be valid for.

When processing circuit 140 receives control 30 and determines the destination of the optical signal 10, processing circuit 140 determines the next hop or node in the path based on the routing table. Processing circuit 140 may then cause optical switch 130 to switch the incoming data 20 from one optical output to another so that data 20 may be routed to the appropriate destination.

Processing circuit 140 may also update the control information and output new control signal 30'. In addition, processing circuit 140 may synchronize new control signal 30' with data 20. Processed data 20 and new control signal 30' may be received by the control write element 150. Control write element 150 may perform a polarization envelope modulation on the new control signal 30', to output a new optical signal 10'. That is, control write element 150 switches the polarization of output data 20.

The above mentioned technique may have many advantages over previously suggested method of in-passband communication. For instance, because the photodetection is insensitive to polarization, there may be no inherent power penalty. It may also be suited for high data bit rates and be transparent to the modulation format of such data. Such technique may also be combined with polarization mode dispersion compensation and performance monitoring approaches.

Also, the control signal read, erase and re-write operation is simpler. The read operation may be performed by monitoring the polarization state of the incoming optical packet at a predetermined bit rate. Erasing may be performed by simply realigning the polarization to a fixed polarization rather than regeneration/wavelength modulation techniques that may require the use of dedicated lasers and remodulation. The re-write operation may be performed by modulating the polarization state of the realigned data signal and packet header rather than using a laser and remodulation circuits.

Further, polarization realignment at the input may allow for single polarization processing. Optical switches, modulators and other optical network components perform better when a single polarization state is involved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. An in-passband optical signaling method comprising the steps of:
   extracting a control component and a data component from an optical signal;
   extracting a control signal from the control component to determine a state of an optical switch;
   switching the state of the optical switch based on the extracted control signal;
   updating the control component;
   remodulating a polarization state of the data component with the updated control component; and
   realigning the updated control component with the data component.

2. The method according to claim 1, wherein the control component is extracted by monitoring a polarization state of the optical signal.

3. The method according to claim 1, wherein the data component is extracted using conventional polarization insensitive photodetection.

4. The method according to claim 1, wherein the control component of the optical signal is a polarization envelope modulated control signal.

5. An optical node suitable for in-passband communication comprising:
   a control erase element operable to realign a polarization state of an optical signal to a fixed polarization state;
   a control read element operable to monitor polarization state of the optical packet in order to obtain a control signal component;
   an optical switch operable to switch a data component from one circuit to another circuit;
   a processing circuit operable to extract a control signal from a control component, operable to switch a state of the optical switch based on the control signal and operable to update the control component; and
   a control re-write element operable to remodulate the polarization state of the data component with the updated control component.

6. The optical node according to claim 5, wherein the control component of the optical signal is a polarization envelope modulated control signal.

7. The optical node according to claim 5, wherein the control erase element further comprises a polarization modulator and a control circuit.

8. The optical node according to claim 5, wherein the control read element is a polarimeter.

9. The optical node according to claim 5, wherein the optical switch comprises single-polarization switch fabric.

10. A packet-switched network system comprising:
    a series of nodes connected one another for transmitting an optical signal, the optical signal comprising:
    a remodulated data portion, a polarization state of the remodulated data portion being remodulated from a data portion for transporting information; and
    an updated control portion, updated from a control portion appended to the data portion, the control portion containing control information for routing the optical signal over a packet-switched network, and
    wherein the control information is encoded using optical polarization states present in optical signals forming the optical packet.

11. The system according to claim 10, wherein the control information comprises an address label that comprises routing information.

12. The system according to claim 11, wherein the control information comprises an address label that comprises an IP address.

13. The system according to claim 10, wherein the optical signal is in code division multiple access format.

14. The system according to claim 10, wherein the optical signal is in a pulsed return to zero format.

15. The system according to claim 10, wherein the optical signal is in differential phase-shift keying format.

16. The system according to claim 10, wherein the optical signal is in chirped return to zero format.

17. The system according to claim 10, wherein the optical signal is in non return to zero format.

18. The system according to claim 10, wherein the optical signal is in analog subcarrier multiplexed format.

19. The system according to claim 10, wherein the control portion is polarized enveloped modulated.

* * * * *

UNITED STATES PATENT AND TRADEMARK OFFICE
CERTIFICATE OF CORRECTION

| | | |
|---|---|---|
| PATENT NO. | : 7,920,790 B2 | Page 1 of 1 |
| APPLICATION NO. | : 11/517983 | |
| DATED | : April 5, 2011 | |
| INVENTOR(S) | : Toliver | |

It is certified that error appears in the above-identified patent and that said Letters Patent is hereby corrected as shown below:

In the Specification

In Column 4, Line 26, delete "(reamplificaion" and insert -- (reamplification --, therefor.

In Column 6, Line 7, delete "element 130." and insert -- element 120. --, therefor.

In Column 6, Line 24, delete "element 130, control read element 130" and insert -- element 120, control read element 120 --, therefor.

Signed and Sealed this
Eighteenth Day of November, 2014

Michelle K. Lee
*Deputy Director of the United States Patent and Trademark Office*